Figure 1:
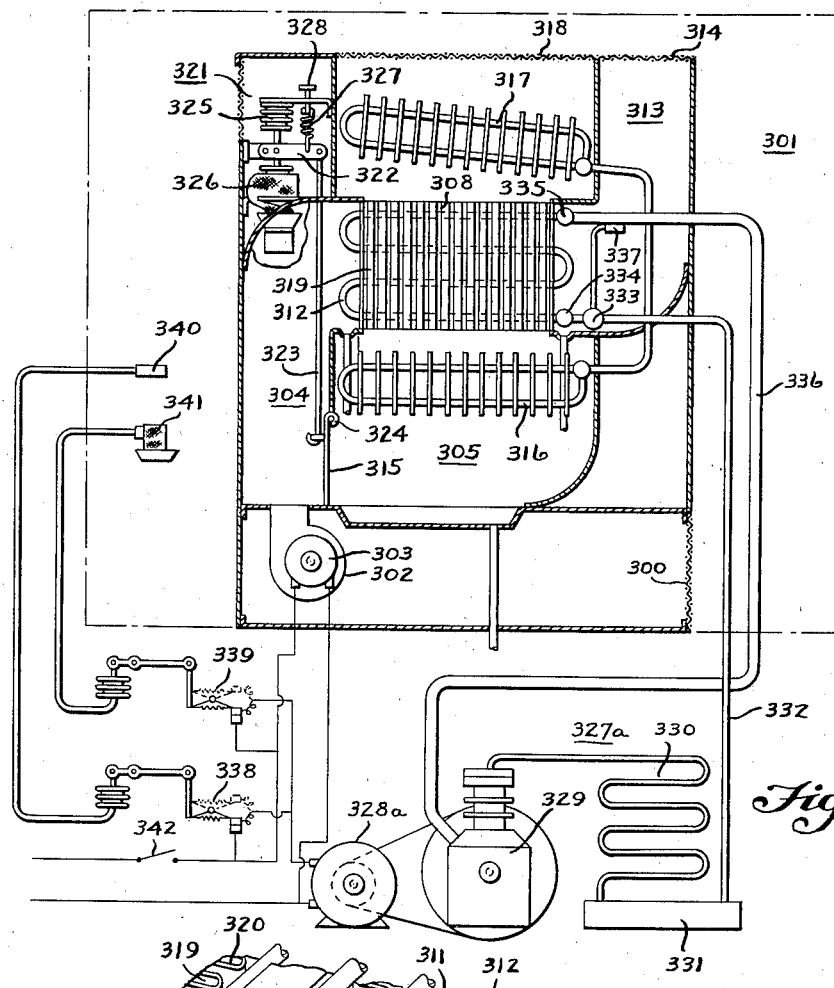

Sept. 10, 1940. H. B. HULL 2,214,057
REFRIGERATING APPARATUS
Original Filed Dec. 24, 1934

Harry B. Hull INVENTOR.
BY Spencer, Hardman & Fehr
His ATTORNEYS

Patented Sept. 10, 1940

2,214,057

UNITED STATES PATENT OFFICE 2,214,057

REFRIGERATING APPARATUS

Harry B. Hull, Dayton, Ohio, assignor to General Motors Corporation, Dayton, Ohio, a corporation of Delaware Original application December 24, 1934, Serial No. 758,884. Divided and this application November 27, 1936, Serial No. 112,895

4 Claims. (Cl. 257—245)

This invention relates to the conditioning of air.

It is an object of this invention to provide a novel heat exchange unit which is especially adaptable for use in air conditioning apparatus which are capable of dehumidifying the air with substantially no reduction in dry bulb temperature when conditions require such treatment and which are capable of conditioning the air with a reduction of dry bulb temperature in varying amounts as conditions require.

It is another object of this invention to provide a heat exchange unit which may be used for conditioning a plurality of streams of fluid.

Still another object of this invention is to provide a head exchange unit which is of light weight, inexpensive, and at the same time, rugged and efficient.

Further objects and advantages of the present invention will be apparent from the following description, reference being had to the accompanying drawing, wherein a preferred form of the present invention is clearly shown.

Figure 2:
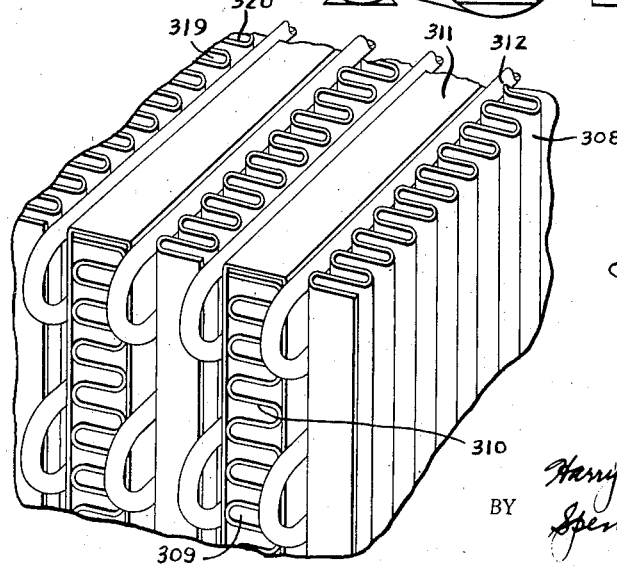

In the drawing:

Fig. 1 is a view, somewhat diagrammatic, and partly in cross-section of an apparatus embodying features of my invention; and Fig. 2 is a view in perspective of a portion of the apparatus shown in Fig. 1.

My novel heat exchange unit is especially suitable for use in apparatus of the type shown in Fig. 1 of the drawing. In the apparatus shown in the drawing, air may enter through the inlet 300 from the space 301 or from outside space, or from both. It may flow under action of a blower 302 driven by motor 303 either into the passageway 304 or passageway 305, or both. If it flows through the passageway 304, it comes into thermal exchange relationship with the evaporator 308 by passing through the passages 309 formed by the corrugated metal sheet 310 which is placed inside of the metal box 311 the sides of which come in contact with the coils 312 of the evaporator 308. After passing through the passageways 309, the air is discharged through the passageway 313, and through outlet 314, into the space 301.

If the damper 315 swings to the left, then the air from blower 302 flows into passageway 305, from whence it comes in thermal exchange with the secondary refrigerant evaporator 316 thence in thermal exchange with the evaporator 308 thence in thermal exchange with the secondary refrigerant condenser 317. Thereafter the air is discharged through the outlet 318 into the space 301. Under such conditions the air flowing in thermal exchange with the evaporator 308 passes through vertical passageways 319 formed by the corrugated metal sheet 320 placed in contact with the coils 312 of the evaporator 308.

The flow of air through the apparatus, and consequently the amount of heat which is transferred to the secondary refrigerant, is governed in accordance with air conditions, preferably the relative humidity conditions of the air in space 301. Thus the psychrometer 321 actuates the lever 322 which in turn actuates the rod 323 which is connected to the damper 315 and switches it about the fulcrum 324. The psychrometer 321 may include a dry bulb 325 and a wet bulb 326 in opposed relationship. The construction is such that as relative humidity rises, the pressures in the bulbs 325 and 326 tend to equalize, and under such conditions the damper 315 is swung upwardly toward the left causing the flow through passageway 305 in thermal exchange with the evaporators 316, 308 and with the condenser 317. When the relative humidity is low, then the tendency of the flow of air is through the passageway 304. A spring 327 opposes slightly the thrust of dry bulb 325 and its tension may be adjusted by the screw and knob 328 so that the relative humidity to which the psychrometer is responsive may be varied for individual requirements.

It is to be understood that, with respect to Fig. 1 the position of the air dampers may be intermediate, so that part of the air may be flowing in thermal contact with the secondary refrigerant while part of the air does not come in thermal contact with the secondary refrigerant. Thus the action described may vary from one extreme to the other and to any intermediate position.

The primary evaporator 308 may be connected to a refrigerant liquefying unit 327a. This unit may include a motor 328a, compressor 329, primary refrigerant condenser 330, and liquid receiver 331. Liquid primary refrigerant flows through the line 332 through valve 333, which automatically introduces liquid refrigerant into the evaporator 308 when the pressure in the evaporator is reduced below a predetermined limit, into the lower header 334. From thence the refrigerant flows in parallel relationship through a plurality of sinuous conduits 312 to the upper header 335. From thence the evaporated refrigerant returns through the line 336 through the compressor 329. The valve 333 may be provided with a thermostatic bulb 337 placed in thermal exchange with the outlet of the evaporator and which automatically throttles the valve 333 when the refrigerant effect becomes sufficiently effective on the bulb 337. The calibration of the valve 333 preferably is such that the temperature of the air cooling surface of the evaporator 308 is maintained above the freezing point of water, but it is to be understood that, if desired, the evaporator may be operated at any temperature below the freezing point of water and may be periodically defrosted either during each cycle of the unit or by a special defrosting cycle.

The cooling action of the primary refrigerant may be controlled by starting and stopping the liquefying unit 327a. Thus, the motor 328a may be started and stopped by the switches 338 and 339 placed in electrical parallel relationship and which are actuated by dry bulb 340 and wet bulb 341 respectively. A hand switch 342 may be provided in such a position that the motor 303 must be first operated before the motor 328a can be operated. If desired, the switches 338 and 339 may be replaced by a psychrometer of the type shown in Fig. 7 of my parent application, Serial No. 758,884, now Patent No. 2,093,725 issued September 21, 1937, of which this is a division, or the switches 338 and 339 may be replaced by a switch similar to the switch 40 shown in Fig. 1 of the above mentioned application, in which case the operation of the unit 327a will be in response to the effective temperature in space 301.

While the preferred form of automatic controls have been specifically illustrated and described, it is to be understood that their form and character may be modified, if desired. For example, wherever a dry bulb thermostat is illustrated or described, the same may be replaced by a wet bulb thermostat, humidostat or effective temperature responsive instrument. Likewise wherever a wet bulb thermostat, humidostat or effective temperature responsive instrument is illustrated or described, the same may be replaced by any one of the other three controls referred to.

While the form of embodiment of the present invention as herein disclosed, constitutes a preferred form, it is to be understood that other forms might be adopted, all coming within the scope of the claims which follow.

What is claimed is as follows:

1. In combination, an air temperature modifier having a plurality of sections of conduit through which an attemporating fluid is adapted to flow, corrugated metal sheets for spacing said sections, and a wall member between adjacent corrugated sheets separating the air flowing over one corrugated sheet from the air flowing over an adjacent corrugated sheet, the corrugations of one of said sheets being arranged at an angle to the corrugations of another of said sheets whereby the air flowing over one of said sheets flows at an angle to the air flowing over another of said sheets, and means for varying the amount of air flowing over one of said sheets.

2. In an evaporator, means forming a refrigerant flow passage, means for directing one stream of air substantially vertically, and for directing another stream of air substantially horizontally in thermal exchange relationship with said refrigerant flow passage means, said air directing means comprising corrugated sheet metal members in thermal exchange relationship with said refrigerant flow passage means.

3. In combination, a coiled heat exchange element, corrugated sheet metal means for directing a first stream of air substantially vertically in thermal exchange relationship with said element, corrugated sheet metal means for simultaneously directing a second stream of air substantially horizontally in thermal exchange relationship with said element, and means for varying the amount of air flowing in thermal exchange relationship with said element in one of said directions.

4. In combination, an air temperature modifier having a plurality of sections of conduit through which an attemporating fluid is adapted to flow, corrugated metal sheets for spacing said sections, and a wall member between adjacent corrugated sheets separating the air flowing over one corrugated sheet from the air flowing over an adjacent corrugated sheet, the corrugations of one of said sheets being arranged at an angle to the corrugations of another of said sheets whereby the air flowing over one of said sheets flows at an angle to the air flowing over another of said sheets, means for directing one stream of air over one of said sheets, and means for directing a separate stream of air over another of said sheets.

HARRY B. HULL.